(12) United States Patent
Zhang et al.

(10) Patent No.: US 7,969,948 B2
(45) Date of Patent: Jun. 28, 2011

(54) METHOD FOR IMPLEMENTING HSDPA FOR TD-SCDMA

(75) Inventors: Yincheng Zhang, Guangdong Province (CN); Zijiang Ma, Guangdong Province (CN); Xuejun Yang, Guangdong Province (CN); Zhifeng Ma, Guangdong Province (CN)

(73) Assignee: ZTE Corporation, Guangdong Province (CN)

( * ) Notice: Subject to any disclaimer, the term of this patent is extended or adjusted under 35 U.S.C. 154(b) by 668 days.

(21) Appl. No.: 12/063,872

(22) PCT Filed: Aug. 18, 2006

(86) PCT No.: PCT/CN2006/002101
§ 371 (c)(1),
(2), (4) Date: Jun. 4, 2008

(87) PCT Pub. No.: WO2007/019807
PCT Pub. Date: Feb. 22, 2007

(65) Prior Publication Data
US 2009/0116468 A1    May 7, 2009

(30) Foreign Application Priority Data

Aug. 19, 2005  (CN) .......................... 2005 1 0090924
Oct. 21, 2005  (CN) .......................... 2005 1 0118232

(51) Int. Cl.
*H04J 13/00* (2011.01)
(52) U.S. Cl. ....................................................... 370/335
(58) Field of Classification Search .................. 370/328, 370/329, 335, 336
See application file for complete search history.

(56) References Cited

U.S. PATENT DOCUMENTS

2008/0259863 A1 * 10/2008 Zhang et al. .................. 370/329
2008/0291878 A1 * 11/2008 Zhang et al. .................. 370/336
2008/0301514 A1 * 12/2008 Ma et al. ....................... 714/748
2009/0141678 A1 * 6/2009 Sun et al. ...................... 370/329

FOREIGN PATENT DOCUMENTS

JP     2005184099 A  *  7/2005
WO    WO0211486 A1  *  2/2002
WO    WO2005062489 A1 * 7/2005

* cited by examiner

*Primary Examiner* — Melvin Marcelo
(74) *Attorney, Agent, or Firm* — IP Strategy Group, P.C.

(57) ABSTRACT

The present invention discloses a method for implementing multi-carrier HSDPA for TD-SCDMA system, comprises: establishing a multi-carrier cell at the network side, wherein multiple carrier resources in the multi-carrier cell being managed and allocated as a whole at the network side; configuring HS-PDSCH resources on at least one of the carriers of the multi-carrier cell, and at least one pair of HS-SCCH and HS-SICH physical channel resources on at least one of the carriers, at the same time, creating a MAC-hs to manage the channel resources on the carriers and the configuration of the MAC-hs entity itself; the network side allocating HSDPA resources to a user terminal, and sending the HSDPA resources to the user terminal; and the network side dynamically allocating the HSDPA resources on at least one carrier for the user terminal to transmit service data.

18 Claims, 7 Drawing Sheets

METHOD FOR IMPLEMENTING HSDPA FOR TD-SCDMA

PRIORITY CLAIM

This application is related to and claims priority to a commonly assigned International PCT Application, Serial No. PCT/CN2006/002101, filed Aug. 18, 2006, which is incorporated by reference herein.

FIELD OF THE INVENTION

The present invention relates to the mobile communication field, and especially, relates to a method for implementing multi-carrier HSDPA (high speed downlink packet access) for a TD-SCDMA (Time Division Synchronization Code Division Multiple Access) system.

BACKGROUND OF THE INVENTION

One important character of the third generation mobile communication system is the imbalance of the traffics of uplink and downlink, and the traffic of the downlink will be generally more than that of the uplink. Aiming at this demand, 3GPP ($3^{rd}$ Generation Partnership Project) introduces HSDPA (High Speed Downlink Packet Access) characteristic in the 3G Specification.

In the HSDPA characteristic, a higher speed downlink packet service is provided to improve the utilization efficiency of frequency spectrum by introducing AMC (Adaptive Modulation and Coding) and HARQ (Hybrid Automatic Retransmission Request) technologies and relevant technologies for reducing the processing time delay at the network.

The AMC technology determines the capacity of the present channel according to the circumstances of the channels (channel state information CSI) and determines a proper coding and modulation mode according to the capacity so as to send information at its maximum and realize a higher speed; and for the quality changes of the channel, the AMC can provide a corresponding changed modulation and coding solution, thereby improving the transmission speed and the utilization efficiency of the frequency spectrum.

The HARQ is an error correcting method which combines the traditional ARQ (Automatic Retransmission Request) technology and the FEC (Forward Error Correct) technology. The code sent by a sender can not only detect errors, but also have certain error correcting ability. When a receiver receives information, it will correct errors automatically if the error is within the error correcting capability, and if the errors are beyond the error correcting capacity of an error correcting code but can be detected, the receiver will feedback a corresponding signal to the sender for requesting a retransmission.

In the HSDPA technology, a HS-DSCH (High Speed Downlink Shared Channel) and a MAC-hs (Media Access Control-high speed) sub-layer are newly introduced. At the network side, the MAC-hs is realized in the Node B for the data transmission of the HS-DSCH transmission channel. In the Node B, each cell has a MAC-hs entity, and the MAC-hs not only accomplishes HS-DSCH data processing and dispatching, but also is in charge of the management and configuration of HSDPA physical resources. The MAC-hs comprises functional entities such as the entities for flow control, dispatching/priority control, HARQ function, and TFRC (Transport Format and Resource Choice). In the MAC-hs entities at the Node B side, each UE corresponds to a HARQ entity, which adopts a N-Channel SAW (See And Wait) Protocol, i.e., the HARQ entity adopts the N-channel-SAW-HARQ protocol. One HARQ entity corresponds to multiple HARQ processes, and in the present protocols of 3GPP regarding TD-SCDMA, the HARQ entity of one UE can comprise at most 8 HARQ processes, and different HARQs are marked by process IDs. One HS-DSCH TTI corresponds to a HARQ process. At the UE side, a UE corresponds to a MAC-hs entity, comprising functional entities of the HARQ function, distribution function, re-arrangement function and decomposition function. Wherein the HARQ entity and the HARQ entity in the Node B entity are peer entities, they comprise the same number of HARQ processes, each process forms one-to-one corresponding protocol entities through the process Ed and the process at the Node B side, for receiving the MAC-hs PDU (Protocol Data Unit) data packet, lithe receiver receives data correctly, it will feedback a ACK signal through a following described uplink HS-SICH channel (High Speed Shared Information Channel), and the HARQ process at the Node B side releases the data packet. On the other hand, if the receiver does not receive the data correctly, then it caches the soft data and feedbacks a NAK signal through the HS-SIGH, and the process at the sender side retransmits the data packet, i.e., the HARQ entity processes the retransmission of the MAC-hs PDU data packet according to the process.

In the HSDPA technology of the TD-SCDMA system, the newly introduced HS-DSCH transmission channel is mapped to a newly introduced HS-PDSCH (High Speed Physical Downlink Shared Channel). The HS-PDSCH channel is shared by multiple users in a cell in the mode of time division or code division. The TTI (Transmission Time Interval) of the HS-PDSCH is 5 ms. The HS-PDSCH carries the service data of a user, and the relevant control information for receiving HS-PDSCH is transmitted through a newly introduced accompanying HS-SCCH (High Speed Shared Control Channel), and the HS-SICH is used for transmitting the uplink feedback information. Therefore, these three physical channels are composed of a physical layer closed loop, they conduct processing and transmission in the TTI unit of 5 ms, and these shorter TTI can self-adapt to the time-varying characteristic. Wherein, the control information carried on the HS-SCCH channel comprises: HARQ Process ID, redundant edition, new data identification, HS-SCCH cycle serial number HCSN, UE ID, MF (Modulation Form), identification of transmission block size and physical channel resources; the feedback information carried on the HS-SICH channel comprises: recommended modulation form RMF, recommended transmission block size RTBS and the confirmation information ACK/NAK for confirming whether the data are transmitted correctly. Besides, for transmitting a RRC signaling, the 3GPP further defines the accompanying physical channels of the uplink and downlink in the R5, for carrying the RRC signaling relevant to HSDPA.

According to the present 3GPP protocol, in the TD-SCDMA system, the cell corresponds to the carrier frequency by one-to-one. The configuration method of HSDPA-related channel resources in a single-carrier cell is as follows: one HS-DSCH, multiple HS-SCCHs, a HS-SICH corresponded to each HS-SCCH by one-to-one. When the network side configures HS-DSCH resources for a UE, one to four HS-SCCHs are configured, thus constituting a HS-SCCH set. and meanwhile, a HS-SICH corresponded to each HS-SCCH by one-to-one is configured. In the process of sending HS-DSCH data, for each HS-DSCH TTI, the Node B sends a HS-DSCH-related control channel on a HS-SCCH channel, the UE obtains the information through reading the channel, and sends feedback information on a HS-SICH channel which corresponds to the HS-SCCH by one-to-one. At the Node B side, each HS-DSCH TTI, for a certain UE, chooses a HS-SCCH for the UE by the MAC-hs, i.e., sending the HS-DSCH-related control channel to the UE on the HS-SCCH channel. At the UE side if the HS-SCCH set does not have a HS-SCCH which can be allocated to the UE for using, then the UE monitors the HS-SCCH set continuously, by the comparison between the "UE Identification" information read from the HS-SCCH and the identification of the UE itself, the HS-SCCH actually allocated to the UE is found until the HS-SCCH channel allocated to the UE is found, and from the next TTI, the HS-SCCH is only monitored and received, the control information carried by the HS-SCCH is used to receive HS-DSCH data, and feedback information is sent at a HS-SICH channel corresponding to the HS-SCCH, until at a certain TTI, the UE can not read a UE identification being consistent with itself in the HS-SCCH, or can not read the HS-SCCH, then the UE re-monitors the allocated HS-SCCH set until a HS-SCCH allocated to the UE is found.

The above description is the HSPDA technology in the present 3GPP protocol relevant to TD-SCDMA system. However, the TD-SCDMA system of the present 3GPP protocol is a single-carrier system, i.e., one cell corresponds to a carrier frequency, and the width of the frequency spectrum of a single-carrier frequency is 1.6 M, as the TD-SCDMA adopts a comparative narrow-band TDD mode, the theoretical peak value speed at the single carrier can reach 2.8 Mbps, and the down-peak-rate that can be provided by the single-carrier is lower, and can not meet satisfactorily the demand of the operator on future high speed packet data service. Therefore, technical improvements should be made on the basis of the single-carrier cell HSDPA technology to meet the higher requirement of the operator for high speed packet data service.

SUMMARY OF THE INVENTION

The technical problem that the present invention aims to solve lies in providing a method for implementing multi-carrier HSDPA for time division synchronization code division multiple access system, and on the basis of single-carrier cell high speed downlink packet access, through establishing a multi-carrier cell, the data packets of the user for high speed downlink packet access can be transmitted in multiple carriers.

In order to realize above purpose, the method for implementing multi-carrier HSDPA for time division synchronization code division multiple access system comprises the following:

Step 1, establish a multi-carrier cell at network side, and multiple carrier resources of the multi-carrier cell are managed and allocated as a whole at the network side;

Step 2, configure HS-PDSCH resources on at least one of the carriers of the multi-carrier cell and at least one pair of HS-SCCHs and a HS-SICH physical channel resources on at least one of the carriers, meanwhile create a MAC-hs entity of the high speed media access control sub-layer to manage the channel resource on the carriers and the configuration of the MAC-hs entity itself;

Step 3, the network side allocates HSDPA resources to a user terminal, and sends the HSDPA resources to the user terminal; and Step 4, the network side dynamically allocates the HSDPA resources on at least one carrier to the user terminal for service data transmission.

The above method characterized in further comprising a step that the user terminal reports to the network side the information of the number of the carriers on which it can support to perform the HS-PDSCH processes simultaneously, the information is multi-carrier HSDPA capability information.

The above method, characterized in further comprising a step of releasing the HSDPA resources allocated to the user terminal.

The above method characterized in that each HS-SCCH in step 2 is fixedly configured with a certain HS-SICH on the same carrier as a pair.

The above method characterized in that the network side allocating HSDPA resources to a user terminal in step 3 further comprises the following steps:

Step 31, a RNC at the network side determines the allocation of multi-carrier HSDPA resources for the user terminal and sends a request message to the Node B;

Step 32, a MAC-hs entity of the Node B at the network side allocates at least one of the carriers on which HS-PDSCH physical channel resources will be allocated for service data transmission to the user terminal according to the information of the supported number of carriers reported by the user terminal and the service characteristics carried by the HS-DSCH; and Step 33, the MAC-hs entity of the Node B at the network side allocates at least one pair of the HS-SCCH and HS-SICH physical channel resources to associate with the HS-PDSCH resources on each carrier for carrying the control information of allocating the HS-PDSCH on the carrier and receiving feedback information.

The above method characterized in further comprising the following step:

Step 34, a radio network controller at the network side allocates associated dedicated channel resources on a carrier to the user terminal.

The above method characterized in that sending the HSDPA resources to the user terminal in step 3 further comprises the following steps:

Step 35, the network side sends the HSDPA resources allocated to the user terminal to the user terminal through the methods specified in a radio resource control (RRC) protocol for a Uu interface; and Step 36, the user terminal creates and configures a MAC-hs entity to configure the physical channel resources of the HSDPA and configures the associated dedicated channel resources.

The above method characterized in that at least one pair of the HS-SCCH and HS-SICH physical channel resources allocated to associate With the HS-PDSCH resources on each carrier in step 32 are on the same carrier as that of the HS-SCCH resources.

The above method characterized in that at least one pair of the HS-SCCH and HS-SICH physical channel resources allocated to associate with the HS-PDSCH resources on each carrier in step 32 are on same or different carriers as that of the HS-PDSCH resources, but all pairs of HS-SCCH and HS-SICH physical channel resources of a user terminal are on the one carrier.

The above method characterized in that at least one pair of the HS-SCCH and HS-SICH physical channel resources allocated to associate with the HS-PDSCH resources on each carrier in step 32 are on same or different carriers as that of the HS-PDSCH resources, and all pairs of HS-SCCH and HS-SICH physical channel resources of a user terminal are on multiple carriers.

The above method characterized in that the step 4 further comprises the following steps:

Step 41, the network side allocates the HS-PDSCH resources on at least one carrier dynamically for the user terminal;

Step 42, the network side distributes the service data to the allocated at least one carrier and sends it to the user terminal;

Step 43, the user terminal searches and monitors each carrier-related HS-SCCH physical channel associated with HS-PDSCH resources on each carrier; and Step 44, the user terminal receives the HS-PDSCH physical channel, and merges the service data on at least one carrier into a complete service data stream.

The above method characterized in that when the service data is distributed and sent in step 42, a hybrid automatic retransmission request (HARQ) function entity of the MAC-hs entity distinguishes multiple carriers and meanwhile processes multiple HAPQ protocol processes on each carrier independently, the HARQ protocol processes on said each carrier are distinguished by the property of the carrier, said process is identified by both the carrier property and a process number, and the HARQ processes with the same carrier property and the same process number in the Node B at the network side corresponds to that in the user terminal one by one.

The above method characterized in that during the distribution and sending the service data, the Node B at the network side sends the HARQ process number for each carrier to the user terminal via the HS-SCCH channel allocated to the user terminal to associate with the carrier; at the user terminal side, the user terminal sends feedback information, including confirmation information for confirming whether transmission is correct and channel radio quality indication information, to Node B through the HS-SICH channel which pairs to the HS-SCCH.

The above method characterized in that the step of establishing a multi-carrier cell at the network side in step 1 is realized through that the radio network controller (RNC) initiates a cell setup process and a common transport channel setup process which are specified in a Node B application protocol to the Node B through an Iub interface.

The above method characterized in that the step of configuring the HS-PDSCH resources on at least one carrier in step 2 is realized through that the RNC initiates a physical shared channel reconfiguration process which is specified in a NBAP protocol to the Node B through the Iub interface; wherein, a carrier frequency information element is added in a "PHYSICAL SHARED CHANNEL RECONFIGURATION REQUEST" message which corresponds to the physical shared channel reconfiguration process to indicate which carrier the HS-PDSCH physical channel resource should be configured on.

The above method characterized in that the step of allocating HSDPA resources to the user terminal is realized through that the RNC initiates a radio link setup process and a synchronous radio setup reconfiguration preparation process or an asynchronous radio link reconfiguration process which are specified in the NBAP protocol to Node B through the Iub interface;

wherein, a multi-carrier HSDPA capability information element of the user terminal is added into the messages of "RADIO LINK SETUP REQUEST", "RADIO LINK RECONFIGURATION PREPARE" and "RADIO LINK RECONFIGURATION REQUEST" which correspond to the radio link setup process and the synchronous radio setup reconfiguration process and the asynchronous radio link reconfiguration process. The property information of the carrier is added into the message of "RADIO LINK SETUP RESPONSE", "RADIO LINK RECONFIGURATION READY" and "RADIO LINK RECONFIGURATION RESPONSE" for indicating the carriers on which the HS-PDSCH physical channel resources and the associated pairs of HS-SCCH and HS-SICH physical channel resources are allocated to the user terminal, and the carriers to which the HARQ configuration information belongs.

The above method characterized in that the step of sending the allocated HSDPA resources to the user terminal in step 3 is realized through that the RNC initiates a RRC connection setup process, a radio bearer setup process, a radio bearer reconfiguration process, a radio bearer release process, a transport channel reconfiguration process, a physical channel reconfiguration process and a cell update process which are specified in the RRC protocol to the user terminal through the Uu interface;

wherein, the property information element of the carrier is added into the messages of "RRC CONNECTION SETUP", "RADIO BEARER SETUP", "RADIO BEARER RECONFIGURATION", "RADIO BEARER RELEASE", "TRANSPORT CHANNEL RECONFIGURATION", "PHYSICAL CHANNEL RECONFIGURATION" and "CELL UPDATE CONFIRM" which correspond to the RRC connection setup process, the radio bearer setup process, the radio bearer reconfiguration process, the radio bearer release process, the transport channel reconfiguration process, the physical channel reconfiguration process and the cell update process for indicating the HSDPA resources of each carrier which are allocated to the user terminal.

The above method characterized in that an information element of the numbers of carriers is further added in the messages for indicating the numbers of carriers that the user terminal can use at the same time.

Compared with the prior art, through adopting the multi-carrier HSDPA technology, the present invention permits that the data packets of the HSDPA of a user can be transmitted on multiple carriers, the Node B can be sent on multiple carriers at the same time, and the UE can receive the data of the HSDPA on multiple carriers. Therefore, in the circumstance of multiple carriers, the service speed of a single user can be improved greatly, and theoretically, a single-carrier can provide a peak value service speed of 2.8 Mbps, and if N carriers work at the same time, a service speed up to N×2.8 Mbps can be provided.

Therefore, the present invention not only solves the problem that the down-peak-rate provided by the single-carrier HSDPA technology in the current TD-SCDMA system is low, and especially the down-peak-rate of the single user is greatly improved, the channel characteristics of the relevant physical channels are not modified, and the present invention is completely compatible for the single-carrier HSDPA technology of the TD-SCDMA system.

EMBODIMENTS OF THE INVENTION

Figure 1:
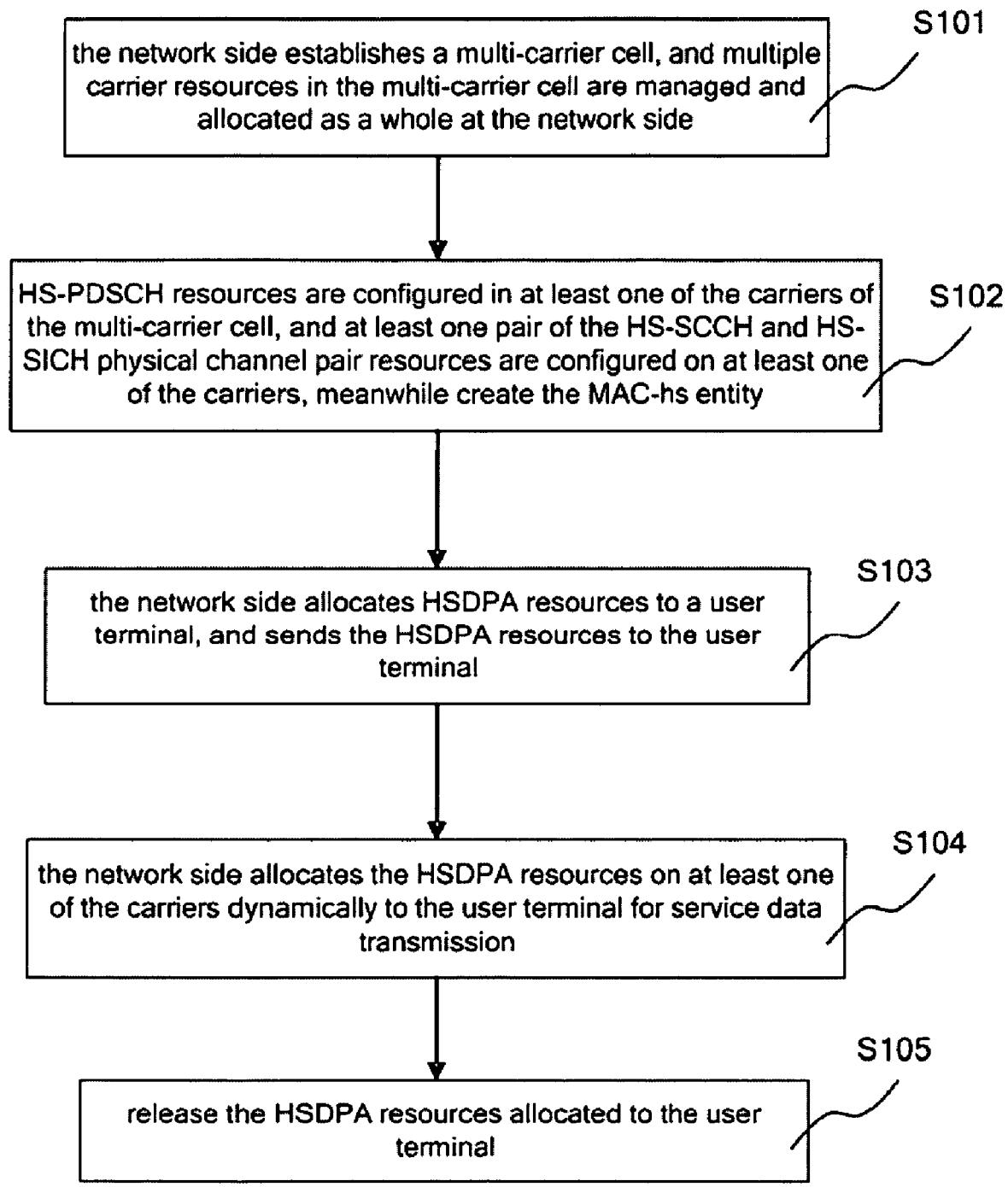
FIG. 1 is a flow chart of the method for implementing the multi-carrier HSDPA of the TD-SCDMA system according to the present invention.

The following is a detailed description of the technical solution of the present invention in conjunction with the accompanying drawings thereof: Refer to FIG. 1, the main flow of the method for implementing the multi-carrier HSDPA of the TD-SCDMA system according to the present invention is shown in FIG. 1, comprising:

Step S101, establish a multi-carrier cell at the network side, and multiple carrier resources in the multi-carrier cell are managed and allocated as a whole at the network side;

Step S102, HS-PDSCH resources are configured on at least one of the carriers of the multi-carrier cell, and at least one pair of HS-SCCH and HS-SICH physical channel resources are configured on at least one of the carriers, meanwhile create the MAC-hs entity of a high speed media access control sub-layer to manage the channel resources of the carrier and the configuration of the MAC-hs entity itself;

Step S103, the network side allocates HSDPA resources to a user terminal, and sends the HSDPA resources to the user terminal;

Step S104, the network side allocates the HSDPA resources on at least one carrier dynamically to the user terminal for the service data transmission; and Step S105, release the HSDPA resources allocated to the user terminal.

If HS-PDSCH resources are configured on multiple carriers by the multi-carrier HSDPA technology according to the present invention and are managed and allocated uniformly, the multiple carriers must be able to be managed and allocated as a whole in a certain manner in a system. At present, this demand can be satisfied in the TD-SCDMA system of N frequency points. In the TD-SCDMA system of N frequency points, one N frequency point cell comprises multiple carriers. At the network side, the multiple carriers in the N frequency point cell are managed as a whole in the unit of cell, and one carrier of the multiple carriers is main carrier, the other carriers are secondary carriers, and a common channel is only established and used on the main carrier. Therefore, the multi-carrier HSDPA technology can be introduced into the TD-SCDMA system of N frequency points. As for the specific contents of the multi-carrier system, please see relevant specifications of the TD-SCDMA system in the China National Standards on Telecommunication.

The following is a detailed description of the complete establishment process of multi-carrier HSDPA resources, taken in conjunction with the accompanying drawings with the TD-SCDMA system of N frequency points as an example.

Figure 2:
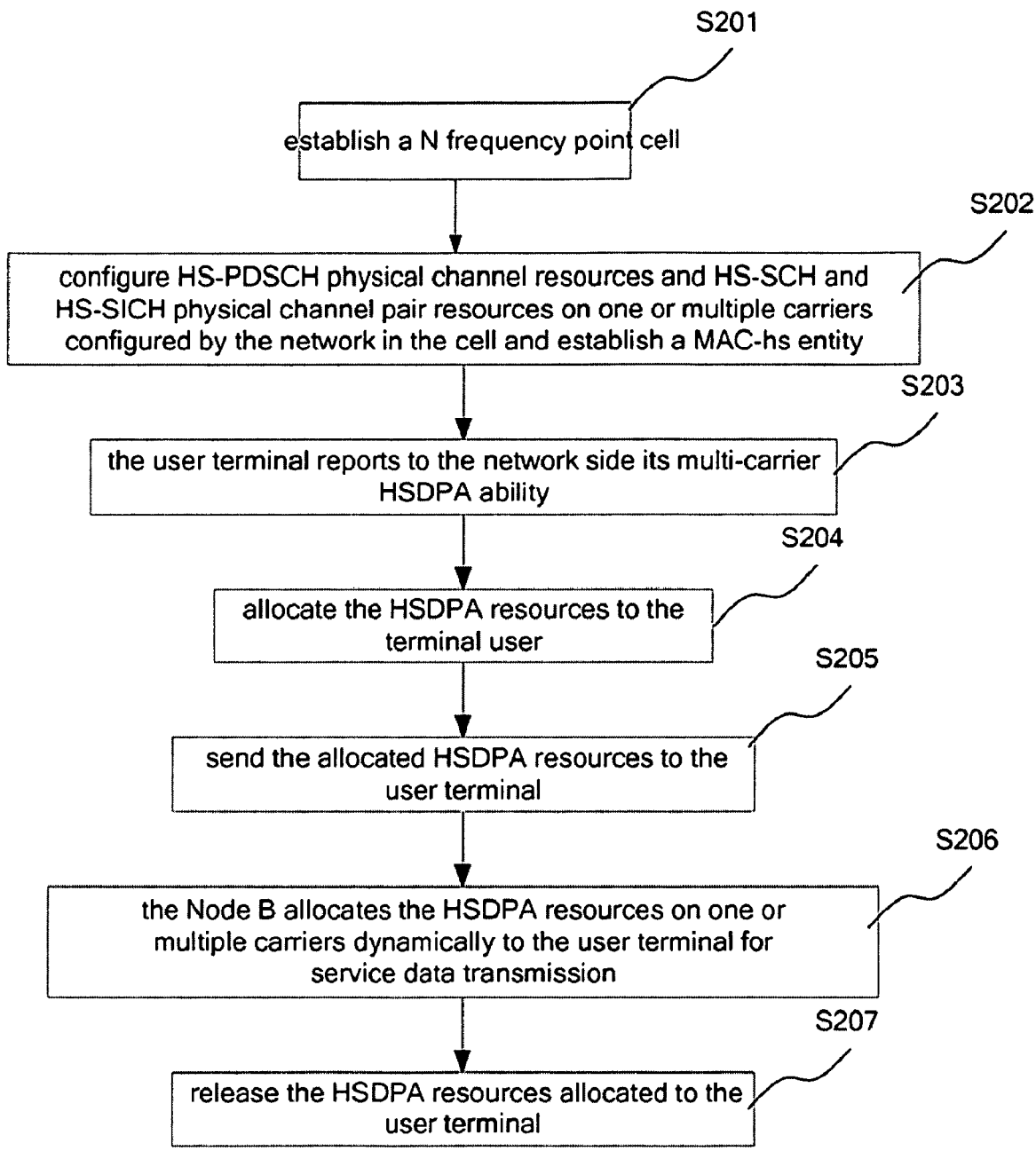
FIG. 2 is a flow chart of the method for implementing the multi-carrier HSDPA of the TD-SCDMA system of N-frequency points according to the present invention.

As shown in FIG. 2, the method for implementing multi-carrier high speed downlink packet access for a time division synchronization code division multiple access system according to the present invention comprises the following steps:

Step 201, establish an N frequency point cell.

The cell comprises a main carrier and auxiliary carriers, and the common channel of the cell needs to be established on the main carrier during the process of establishing the cell. On the basis of the current 3GPP standards or the China National Standards on Telecommunication (the following process is identical with this process), an initial configuration is realized through that the RNC at the network side initiates a cell setup procedure and a common transport channel setup procedure in the NBAP protocol to the Node B through the Iub interface. The RNC can also reconfigure the N frequency point cell and its common channel through initiating a cell reconfiguration procedure and a common transport channel reconfiguration procedure in the NBAP protocol to the Node B through the Iub interface, and for the specific information of the above processes, please see 3GPP standard 25.433, or the files of TD-SCDMA System Iub Interface Technical Specifications_040906_v1 of the China National Standards on Telecommunication.

Step 202, the network side configures HS-PDSCH physical channel resources and HS-SCCH and HS-SICH physical channel pair resources on one or multiple carriers of the cell and establishes the MAC-hs entity.

Figure 4:
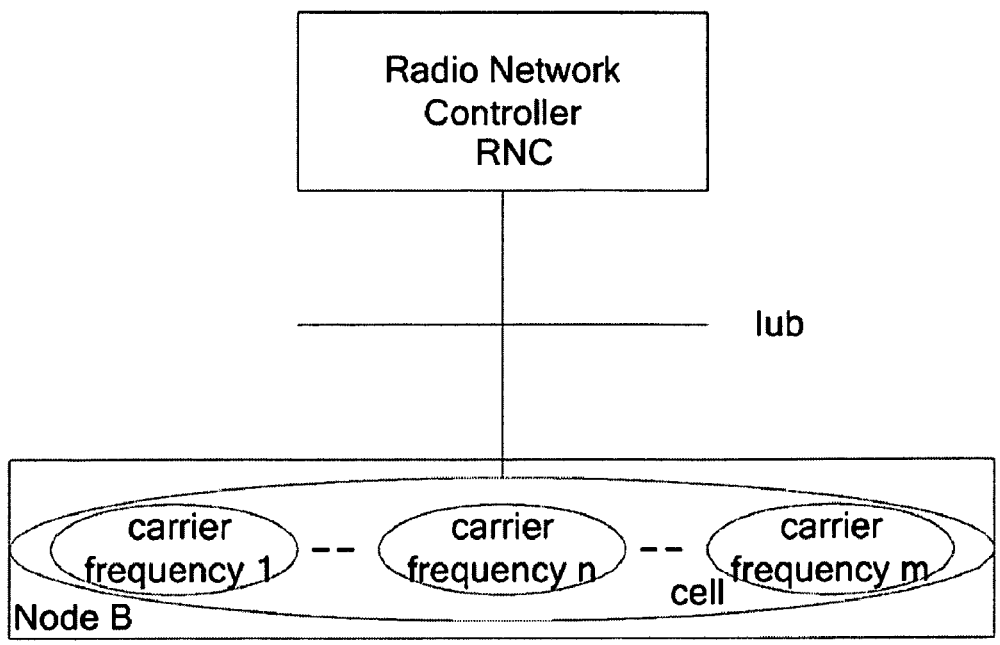
FIG. 4 is a schematic view of the theory of the multi-carrier cell system according to the present invention.
Figure 5:
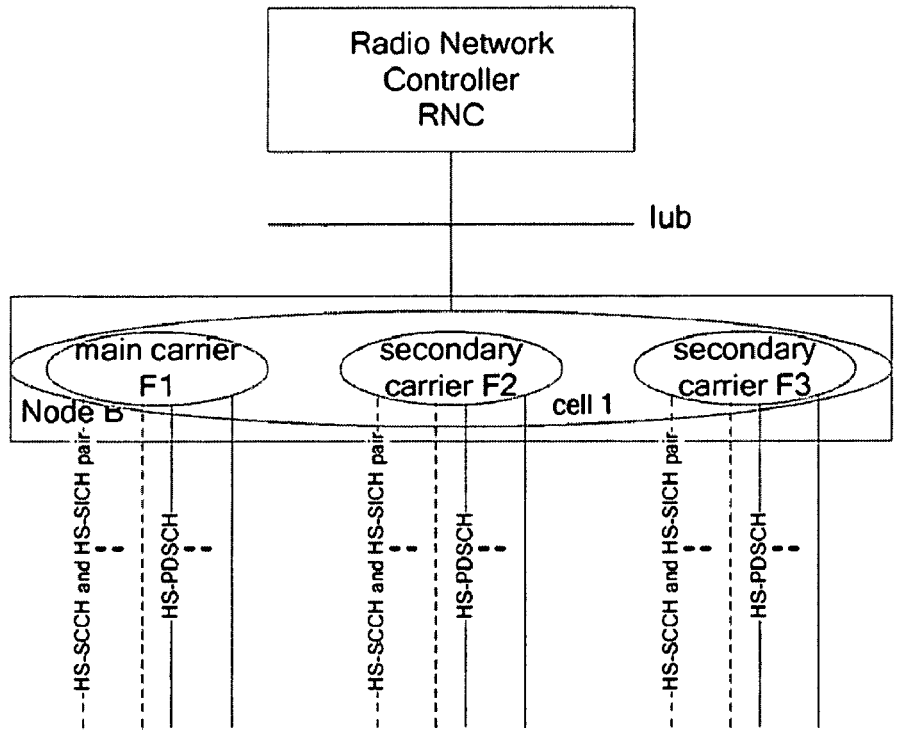
FIG. 5 is a schematic view of the configuration of the HSDPA physical channel resources in the N-frequency point cell of three carriers.

As shown in FIG. 4, in the system of N frequency points, the RNC and the Node B manages and allocates the multiple carriers in the N frequency point cell as a whole. The process of configuring the HS-PDSCH physical channel resources in one or multiple carriers (including the main carrier and the secondary carriers) in the N frequency point cell is realized through that the RNC initiates a physical shared channel reconfiguration procedure in the NBAP protocol to the Node B through the Iub interface, and in a corresponding "PHYSICAL SHARED CHANNEL RECONFIGURATION REQUEST" message, besides other necessary information, the capability of configuring HSDPA resources in multiple carriers should be provided. As for each carrier, besides the relevant information of the single-carrier HSDPA technology common for those skilled in the art, additional carrier information should be provided to the HS-PDSCH physical channel to indicate which carrier frequencies the HS-PDSCH physical channel resource should be configured on.

During the physical shared channel reconfiguration procedure, after the Node B receives the "PHYSICAL SHARED CHANNEL RECONFIGURATION REQUEST" message, a MAC-hs entity is established, the MAC-hs entity manages and allocates relevant HSDPA resources according to the configuration information of the message, including the HS-PDSCH physical channels on all the carriers and multiple pairs of HS-SCCH and HS-SICH physical channel resources.

Besides, the reconfiguration and deletion of the HS-PDSCH physical channel resources and the MAC-hs entity can be realized through the physical shared channel reconfiguration procedure.

Step S203, the user terminal reports to the network side its multi-carrier HSDPA ability, i.e., reporting the information of the number of the carriers on which it can support to perform the HS-PDSCH processes simultaneously, the information is multi-carrier HSDPA capability information.

When the user terminal UE establishes a connection with the network or responds to a system inquiry, the user terminal reports to the network side its multi-carrier HSDPA capability, i.e., the multiple carriers supported by the user terminal and the information of the number of the carriers of the HS-PDSCH that the user terminal processes at the same time. The UE can report to the RNC its multi-carrier HSDPA capability information in the process of the radio connection establishment (RRC connection establishment), and can also report to the RNC in the process of the transmission of the UE capability information.

Step S204, allocate the HSDPA resources to the user terminal.

The network side allocates the HSDPA resources to the user terminal, and the process comprises an initial establishment and reconfiguration process of the HSDPA resources, specifically comprising the following:

The RNC initiates a radio link setup procedure, a synchronized radio link reconfiguration preparation procedure, or an unsynchronized radio link reconfiguration procedure in the NBAP protocol to the Node B through the tub interface, so as to request the Node B to allocate the multi-carrier HSDPA resources to the user terminal. In the messages of "RADIO LINK SETUP REQUEST", "RADIO LINK RECONFIGURATION PREPARE" and "RADIO LINK RECONFIGURATION REQUEST", besides other information common for those skilled in the art and the information relevant to the single-carrier HSDPA technology, such as the QoS characteristics of the HS-DSCH service data stream of the user terminal, the multi-carrier HSDPA capability information of the user terminal needs to be added, too. Meanwhile, the RNC will further select one carrier to allocate an associated dedicated channel resource for the user terminal, including a dedicated transmission channel and dedicated physical channel resources.

The Node B, after receiving the above messages, configures the associated dedicated channel resources according to the configuration information in the messages, and the MAC-hs entity allocates one or multiple HSDPA carrier resources for the user terminal according to the QoS characteristics of the HS-DSCH service data stream of the user terminal, the multi-carrier HSDPA capability information of the UE and the circumstance of the HSDPA resources of the current cell, and indicates the carriers of the HS-PDSCH physical channel resource which may be probably allocated to the user terminal, and one or more pairs of relevant HS-SCCH and HS-SICH physical channel resources are allocated for the HS-PDSCH physical channel resource of each carrier.

The Node B, after accomplishing the resources allocation and configuration relevant to the above multi-carrier HSDPA technology, sends the messages of "RADIO LINK SETUP RESPONSE", "RADIO LINK RECONFIGURATION READY" and "RADIO LINK RECONFIGURATION RESPONSE" to the RNC. In the messages, besides other necessary information, the capability of configuring the HSDPA resources in multiple carriers needs to be provided, the multi-carrier HSDPA technology-related resources allocated for the user terminal on one or more carriers are sent to the RNC, as for each carrier, besides the information relevant to the single-carrier HSDPA technology common for those skilled in the art, carrier property information needs to be added to indicate the carrier to which the HS-PDSCH physical channel resources allocated to the user terminal belongs, and indicate the carriers and the physical channel information of the HS-SCCH and HS-SICH physical channel pair resources which associates with the HS-PDSCH physical channel on each carrier, and the configuration information of the HARQ functional entity.

In addition, in the above messages, the Node B not only comprises the above allocated resources, but also comprises and configures an carrier number information element according to the capability of the user terminal and the number of the carriers of the HS-PDSCH physical channel resources which are allocated to the user terminal, so as to indicate the number of the carriers that can be used by the user terminal at the same time, and the value is less than or equal to the number of the carriers of all HS-PDSCH physical channel resources allocated to the user terminal.

Step S205, send the allocated HSDPA resources to the user terminal.

The RNC sends the HSDPA resources allocated to a certain user terminal to the user terminal, and the process comprises the initial establishment and reconfiguration procedure of the HSDPA resource, specifically comprising the following:

The RNC, after receiving the configuration information of the HSDPA resources allocated by the Node B to the user terminal, sends the information to the user terminal through the relevant processes of the RRC protocol of the Uu interface in conjunction with the configuration information allocated by the RNC itself, including the HSDPA-related resource configuration information and other configuration information, and the processes comprise the procedures of RRC connection establishment, radio bearer establishment, radio bearer configuration, radio bearer release, transport channel reconfiguration, physical channel reconfiguration, cell update etc., and in the corresponding messages of "RRC CONNECTION SETUP", "RADIO BEARER SETUP", "RADIO BEARER RECONFIGURATION", "RADIO BEARER RELEASE", "TRANSPORT CHANNEL RECONFIGURATION", "PHYSICAL CHANNEL RECONFIGURATION", and "CELL UPDATE CONFIRM", the capability of configuring HSDPA resources in multiple carriers needs to be provided, resources relevant to the multi-carrier MSDPA technology allocated to the user terminal on one or multiple carriers are sent to the UE. As for each carrier, besides the information relevant to the single-carrier HSDPA technology, common for those skilled in the art, carrier property information needs to be added for indicating the carrier to which the HS-PDSCH physical channel resource allocated to the user terminal belongs, and providing the HS-SCCH and HS-SICH physical channel pair which is relevant to the HS-PDSCH physical channel resources on each carrier and the configuration information of the HARQ functional entity. In addition, the information of the number of the carriers configured by the Node B can be further comprised for indicating the number of the carriers which can be used by the user terminal at the same time, and the value is less than or equal to the number of the carriers of all HS-PDSCH physical channel resources which are allocated to the user terminal. Meanwhile, the configuration information, including the carrier information and the physical channel information, of the dedicated physical channel resources is further provided for the user terminal.

The user terminal, after receiving the above messages, creates and configures a MAC-hs entity according to the configuration information in the messages, configures the HSDPA-related physical channel resources, the associated dedicated channel resources and other resources, and sends the corresponding response message during the above procedures to the RNC according to the result of the configuration.

Figure 3:
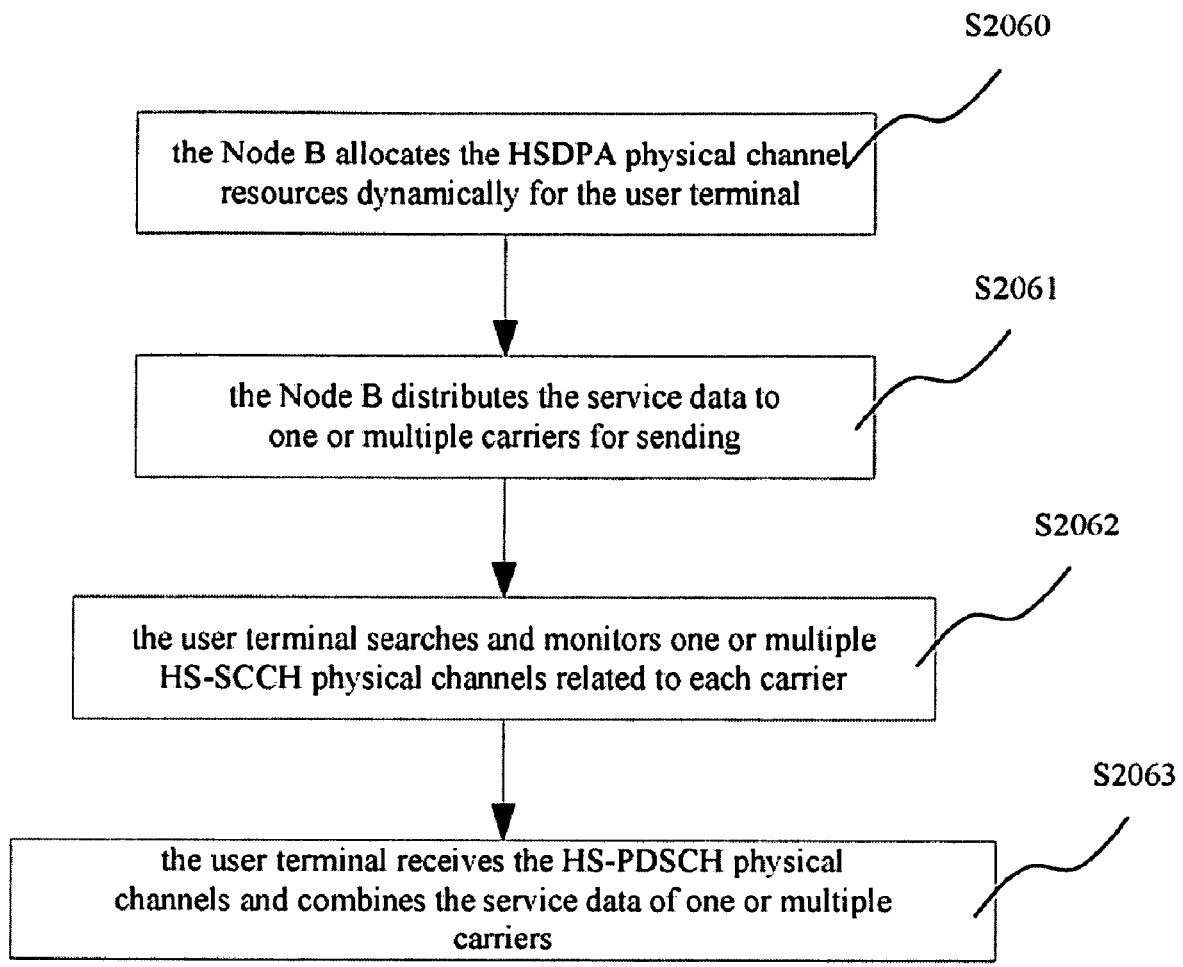
FIG. 3 is a flow chart illustrating that the Node B allocates HSDPA resources to the user terminal dynamically.

Step S206, the Node B allocates the HSDPA resource on one or multiple carriers dynamically to the user terminal for service data transmission. As shown in FIG. 3, this step comprises the following steps:

Step S2060, the Node B allocates HSDPA physical channel resources dynamically for the user terminal.

For a certain user terminal allocated with the HSDPA resources, in the Node B at the network side, in the unit of TTI, the MAC-hs entity receives from the RNC the HS-DSCH service data sent to the user terminal, and according to the HS-DSCH service data stream, the priorities of the user terminal and the service, the receiving circumstance information of the previously allocated HS-DSCH service data fed back by the UE, and the above HSDPA carrier resources allocated to the user terminal and the load of the HS-PDSCH physical channel resources on the carriers, among the one or more HSDPA carrier resources allocated to the user terminal, the HS-PDSCH physical channel resources of the one or multiple carriers allocated to the user terminal is firstly determined. Then, for each selected and determined carrier, proper HS-PDSCH physical channels are determined, one of the multiple pairs of HS-SCCH and HS-SICH physical channel pairs which are allocated on the above and relevant to the HS-PDSCH physical channel resources on the carrier is chosen, the HS-PDSCH physical channel information allocated to the carrier and other HSDPA-related configuration information, including the "user terminal identification" information, are sent to the UE through the HS-SCCH channel.

Step S2061, the Node B distributes the service data to one or multiple carriers for sending.

In the unit of TTI, in the Node B at the network side, the MAC-hs entity distributes the HS-DSCH service data to each carrier for sending according to the number of the carriers above allocated for the HS-DSCH service data transmission, and the bearer capacity of the HS-PDSCH physical channel allocated to each carrier.

Wherein, the HARQ function entity in the MAC-hs entity receives the HS-DSCH service data distributed to each carrier by the MAC-hs in the unit of carrier, and respectively processes those data independently. One UE has one HARQ function entity in the MAC-hs entity of the Node B, in the HARQ function entity, each carrier is differentiated to conduct configuration respectively, and the HARQ protocols in multiple carriers are processed independently at the same time, the HARQ protocol processing process on each carrier can be differentiated by the properties of the carriers, the HARQ protocol processing on each carrier can comprise multiple HARQ processes, the configuration of the number of the HARQ processes is completely identical with the single-carrier HSDPA technology, the process Ids of the HARQ processes in different carriers are numbered independently, and the carrier property of a certain process Id is the carrier property of the HS-PDSCH physical channel resource which is relevant to the HS-SCCH physical channel bearing the process Id information. But for the HARQ function entity of the UE, the total number of the HARQ processes needs to be added correspondingly. In the unit of TTI, for each carrier, one of the multiple HARQ processes configured to the carrier is chosen for sending the HS-DSCH service data of the carrier, wherein, the process Id of the HARQ process is sent to the UE by the HS-SCCH physical channel which is relevant to the HS-PDSCH physical channel resources on the carrier and is allocated to the UE.

Step S2062, the user terminal searches and monitors one or multiple HS-SCCH physical channels which are relevant to each carrier.

In the unit of TTI, the user terminal, according to the configuration information, for each carrier allocated with the HS-PDSCH physical channel, monitors one or multiple HS-SCCH channels in the one or multiple pairs of HS-SCCH and HS-SICH physical channel pairs relevant to the carrier continuously, through the comparison between the "user terminal identification" information read from the HS-SCCH channel and the identification of the user terminal itself, one and only one HS-SCCH channel with the identical identification is found, i.e., the HS-SCCH actually allocated to the user terminal. From a next TTI, the HS-SCCH is only monitored and received on one or multiple HS-SCCH channels relevant to the carrier, and at a certain TTI, when the user terminal can not read a user terminal identification being consistent with itself in the HS-SCCH, or can not read the HS-SCCH, then the UE re-searches one or multiple HS-SCCH channels relevant to the carrier continuously, until one HS-SCCH allocated to the user terminal is found again by a certain TTI.

In addition, if the information of the number of the carriers that can be used at the same time is configured for the user terminal, when the number of the HS-SCCH channels which are allocated to the user terminal and searched by the terminal user is identical with the information elements configured for the number of the carriers which can be used at the same time by the user terminal, searching the HS-SCCH physical channel which is allocated to the user terminal and relevant to other carriers can be stopped.

Step S2063, the user terminal receives the HS-PDSCH physical channel, and combines the service data of one or multiple carriers.

In the unit of TTI, at the user terminal side, for each HS-SCCH physical channel, monitored by the user terminal side, which is allocated to and received by the current user terminal, the HS-PDSCH physical channel is received on the HS-SCCH channel-related carrier according to the control information relevant to the HS-PDSCH physical channel on the HS-SCCH channel.

Meanwhile, the HARQ function entity in the MAC-hs entity respectively conducts HS-DSCH service data receiving and processing in the unit of carrier. Corresponding to the HARQ function entity of the user terminal in the Node B, the HARQ function entity of the user terminal side differentiates each carrier and conducts configuration for each carrier respectively, and meanwhile, processes the HARQ protocols of multiple carriers independently, the HARQ protocol processing process on each carrier can be differentiated by the property of the carrier, the HARQ protocol processing in each carrier can comprise multiple HARQ processes, the configuration of the number of the HARQ processes is completely identical with the single-carrier HSDPA technology, the process Ids of the HARQ processes in different carriers are numbered independently, and the carrier property of a certain process Id is the carrier property of the HS-PDSCH physical channel resources which is relevant to the HS-SCCH physical channel and bears process Id information. But the number of the HARQ processes of the total HARQ function entity needs to be added correspondingly. In the unit of TTI, each process Id and the carrier information of the HS-PDSCH physical channel which is relevant to the HS-SCCH channel carrying the information are sent to the HARQ function entity, according to which the HARQ function entity processes the HARQ protocol for the HS-DSCH service data transmission on each carrier respectively. The feedback information relevant to the receiving situation of the HS-DSCH service data is sent to the Node B on the HS-SICH physical channel of the same carrier to which the HS-SCCH corresponds, including confirmation information ACK/NAK for confirming whether the data are transmitted correctly and channel quality indication (CQI).

Then, the MAC-hs entity in the UE processes, such as arranging order and combining, the HS-DSCH service data received from the HS-PDSCH physical channel on one or multiple carriers, and submits the data to the upper layer.

Step S207, release the HSDPA resources allocated to the user terminal.

The RNC initiates the procedures, such as Synchronized Radio Link Reconfiguration Preparation procedure, Unsynchronized Radio Link Reconfiguration procedure or Radio Link Deletion of the NBAP protocol to the Node B through the Iub interface, and deletes the HSDPA resources allocated to the user terminal. The RNC initiates the procedures such as the radio bearer reconfiguration, the radio bearer release, the transport channel reconfiguration, and the physical channel reconfiguration in the RRC protocol to the UE through the Uu interface, and commands the UE to release the HSDPA resources.

In the above step of allocating the HSDPA resources to the user terminal, when one or more pairs of HS-SCCH and HS-SICH physical channel resources are associated with the HS-PDSCH physical channel resources in each carrier, in different association methods, the configuration and the allocation of the relevant physical channel are different.

Figure 6:
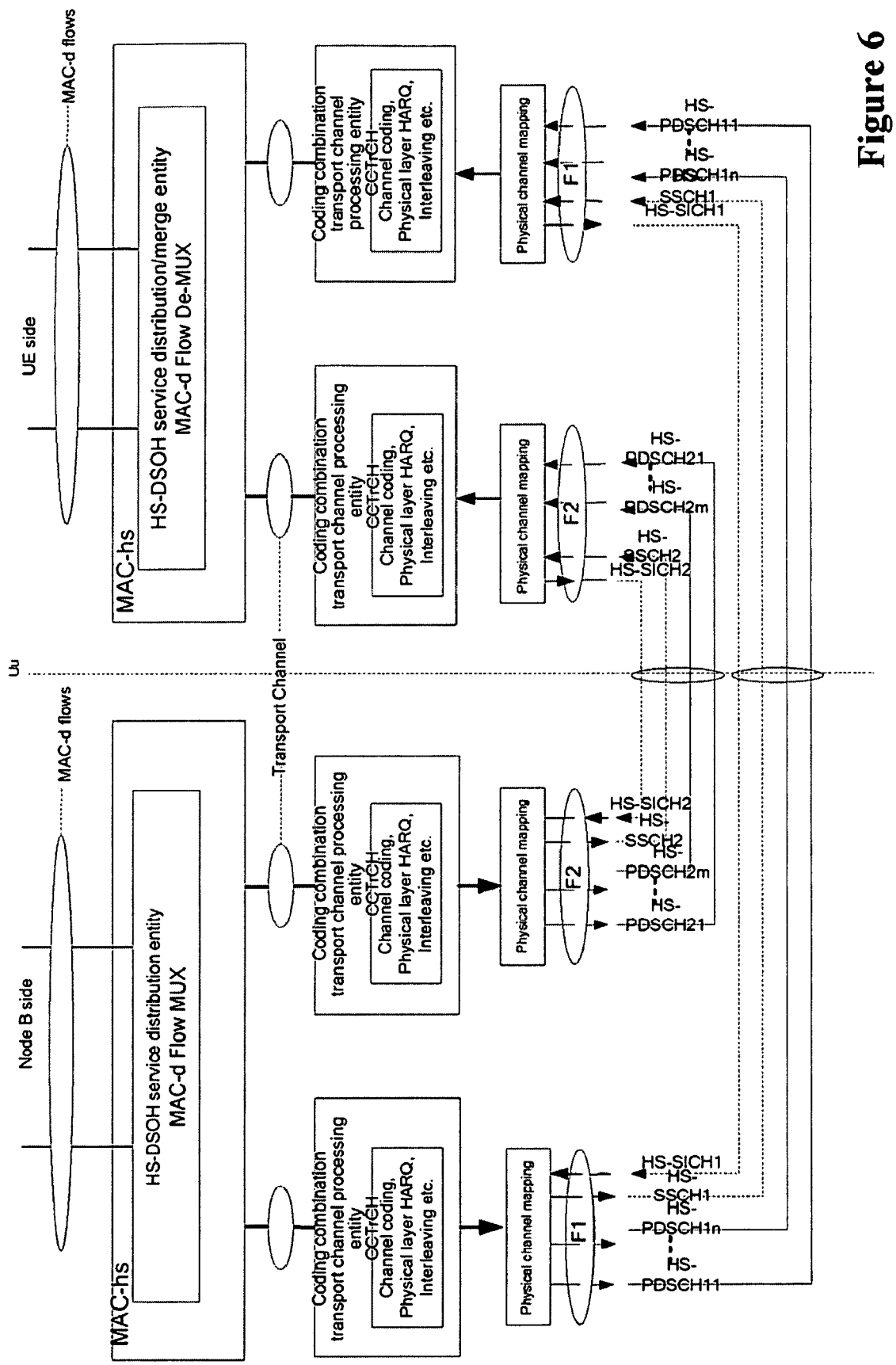
FIG. 6 is a schematic view of the configuration relationship of the HSDPA resources in the TD-SCDMA system according to embodiment 1 of the present invention.
Figure 7:
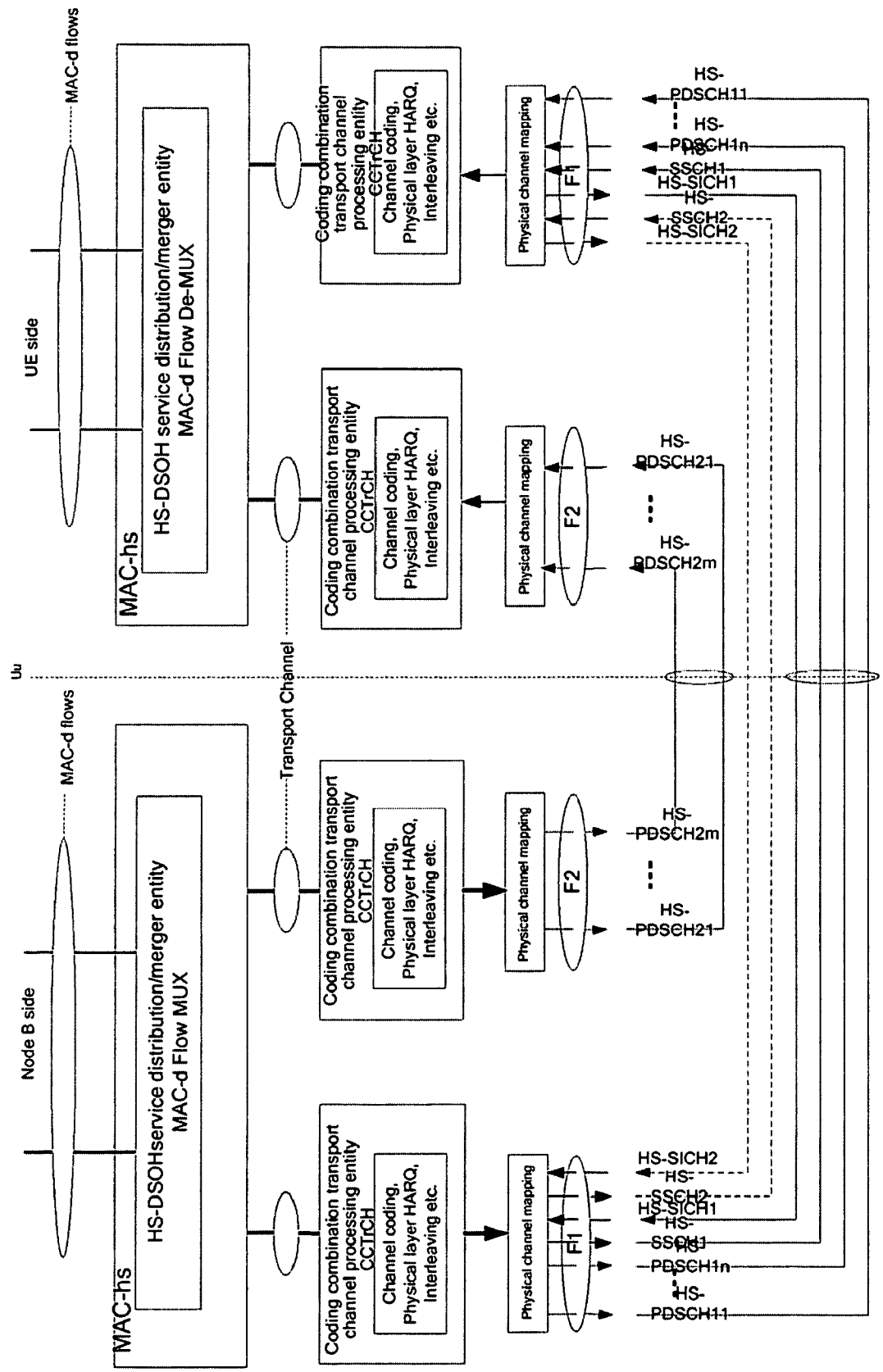
FIG. 7 is a schematic view of the configuration relationship of the HSDPA resources in the TD-SCDMA system according to embodiment 2 of the present invention.
Figure 8:
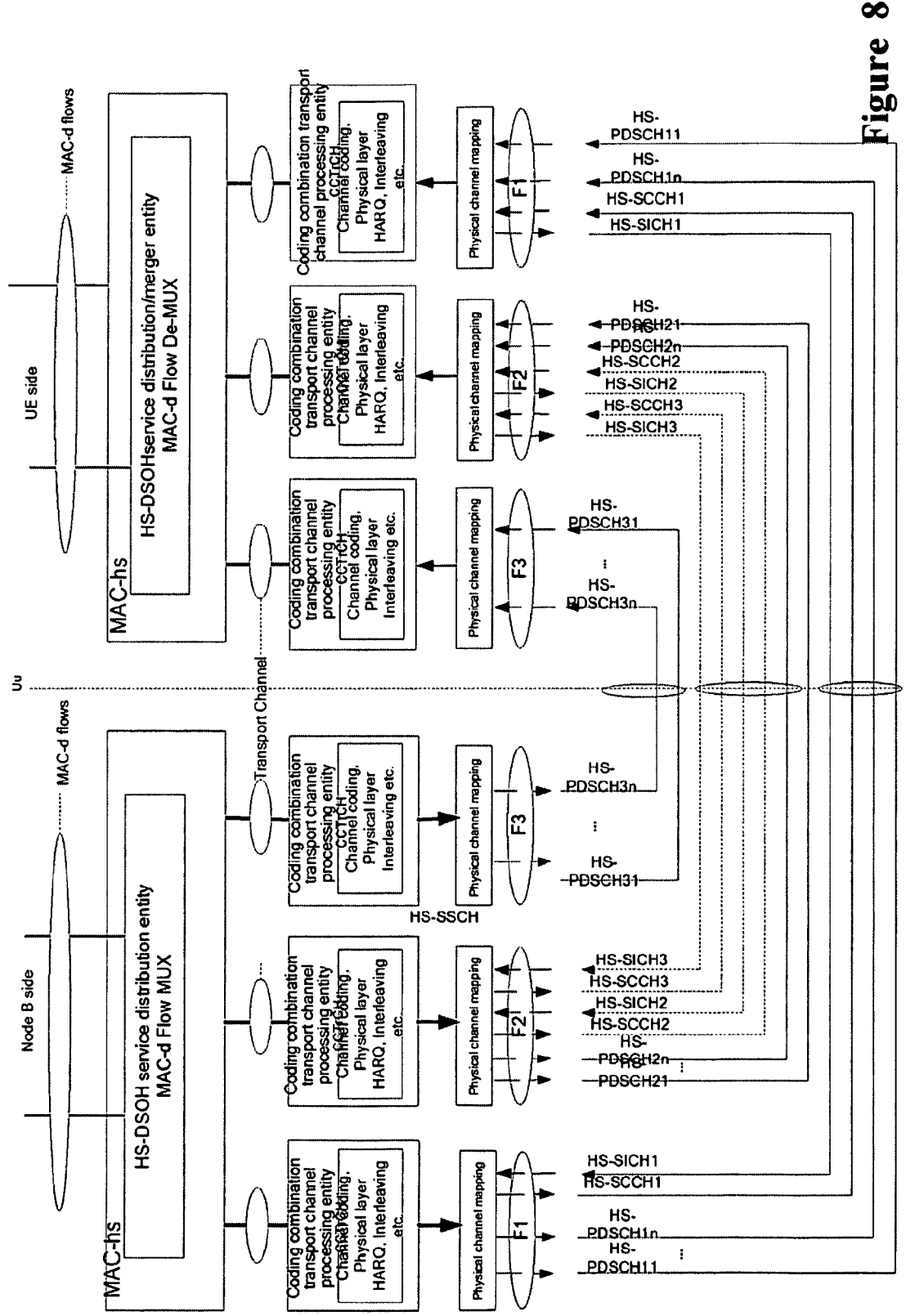
FIG. 8 is a schematic view of the configuration relationship of the HSDPA resources in the TD-SCDMA system according to embodiment 3 of the present invention.

The following takes a N frequency point cell of three carriers as an example, and referring to FIGS. 5-8, different association method and the difference of relevant physical channel configuration and the allocation methods are specifically described through different embodiments, wherein, in FIGS. 6, 7 and 8, CCTrCH is a procession entity of the coding composition transmission channel, the entity is completely identical with the CCTrCH entity of the current CCSA and the 3GPP standards; MAC-d Flow MUX/De-MUX is the HS-DSCH service distribution/merger entity in the MAC-hs entity.

Embodiment 1

In the present embodiment, based on a system of N frequency points, the HS-PDSCH physical channel resources on each carrier can only associate with one or more pairs of HS-SCCH, and HS-SICH physical channel resources on the present carrier, The following steps are specifically comprised:

Step 1, establish one N frequency point cell of three carriers, and the cell comprises one main carrier F1 and two secondary carriers F2 and F3;

Step 2, the HS-PDSCH physical channel resources and the HS-SCCH and HS-SICH physical channel pair resources are configured on all the three carriers of the cell:

Step 3, the UE has the report capability of processing the HS-PDSCHs of two carriers at the same time;

Step 4, as shown in FIG. 6, two HSDPA carrier resources F1 and F2 are allocated to the UE, the HS-SCCH1/HS-SICH1 physical channel pair, which is allocated to the carrier F1, is associated with the HS-PDSCH physical channel resources on the carrier, the HS-SCCH2/HS-SICH2 physical channel pair, which is allocated to the carrier F2, is associated with the HS-PDSCH physical channel resources on the carrier. Under this association method, the HS-SCCH and HS-SICH physical channel pair on one carrier is fixedly associated With the HS-PDSCH physical channel resources on the carrier. Therefore, in the corresponding messages of the Iub and the Uu interfaces, the association relationship between the HS-SCCH and HS-SICH physical channel pair and a carrier need not be indicated by other information. In the messages, only the information of the HS-SCCH and HS-SICH physical channel pair resources on one or multiple carriers needs to be configured, including the carrier information and the physical channel information. Wherein, the carrier information also indicates one or multiple HS-PDSCH physical channel carrier resources allocated to the UE at the same time.

Step 5, the RNC sends the information of the HS-SCCH1/HS-SICH1 physical channel pair resources allocated to the carrier F1 and the information of the HS-SCCH2/HS-SICH2 physical channel pair resources allocated to the carrier F2 to the user terminal, meanwhile indicates the HS-PDSCH physical channel carrier resources at F1 and F2 allocated to the UE.

Step 6, the Node B allocates the HS-PDSCH physical channel resources on carriers F1 and F2 dynamically to the user terminal for the service data transmission. The step further comprises the following steps:

Step 61, the Node B allocates the HS-PDSCH11-1n physical channel resources on carrier F1 and HS-PDSCH21-2m physical channel resources on carrier F2 dynamically for the user terminal, and these resources are sent to UE through the HS-SCCH1 and the HS-SCCH2;

Step 62, the MAC-hs in the Node B distributes the service data to carriers F1 and F2, the coding composition transmission channel process, physical mapping and sending are conducted independently on each carrier.

Step 63, the UE respectively searches and monitors the HS-SCCH1 and HS-SCCH2 physical channels associated with carriers F1 and F2, if the UE identification on the HS-SCCH1 and HS-SCCH2 physical channels are identical with the UE identification itself, the HS-PDSCH11-1n physical channels on carrier F1 and HS-PDSCH21-2m physical channels on carrier F2 are respectively received according to the control information relevant to the HS-PDSCH physical channel allocation on the HS-SCCH1 and HS-SCCH2;

Step 64, the UE respectively receives the HS-PDSCH11-1n physical channels on carrier F1 and HS-PDSCH21-2m physical channels on carrier F2, and independently conducts the process of physical channel mapping and CCTrCH, and then the MAC-hs in the UE mergers the service data received from carriers F1 and F2 into one complete service data and submits the service data to an upper later; and Step 7, if the UE requests, or the RNC determines, or the core network orders the RNC to release the HSDPA-related service and resources, the RNC respectively sends the relevant orders to Node B and the UE to release the HSDPA resources allocated to the user terminal.

Embodiment 2

In the present embodiment, based on a system of N frequency points, the HS-PDSCH physical channel resources on each carrier and one or multiple pairs of HS-SCH and HS-SICH physical channel resources associated with the HS-PDSCH physical channel resources can be located on the same or different carriers, but all the HS-SCCH and HS-SICH physical channel pair resources associated with the HS-PDSCH physical channel resources on all the carrier of one UE are requested to locate on one carrier. The step 4 and the step 5 of embodiment 2 are different from those of embodiment 1, and are specifically as follows:

Steps 1, 2, 3, 6 and 7 are identical with those of embodiment 1, which will not be described again;

Step 4, as shown in FIG. 7, two HSDPA carrier resources F1 and F2 are allocated to the UE, the HS-SCCH1/HS-SICH1 physical channel pair and the HS-SCCH2/HS-SICH2 physical channel pair, which are respectively associated with carriers F1 and carrier F2, are allocated to carrier F1. Under this association method, in the corresponding messages of the Iub and the Uu interfaces, the carrier information of each HS-SCCH and HS-SICH physical channel itself needs to be configured, meanwhile, the carrier information associated with the physical channel needs to be configured.
Wherein, the associated carrier information indicates one or multiple HS-PDSCH physical channel carrier resources allocated to the UE.

Step 5, the RNC sends the HS-SCCH I/HS-SICH1 and the HS-SCCH2/HS-SICH2 physical channel pair resource information on the allocated carrier 1, including the frequency information F1 of itself, to the UE, meanwhile, sends the carrier F1 associated with the HS-SCCH1/HS-SICH1 and the carrier F2 associated with the HS-SCCH2/HS-SICH2 to the UE.

Embodiment 3

In the present embodiment, based on a system of N frequency points, the HS-PDSCH physical channel resources on each carrier and the associated one or multiple pairs of HS-SCH and HS-SICH physical channel pair resources can be on the same or different carriers, and all the HS-SCCH and HS-SICH physical channel pair resources associated with the HS-PDSCH physical channel resources on all the carrier of one UE can be on multiple carriers, which can be specifically shown as follows:

Steps 1, 2 and 7 are identical with those of embodiment 1 and embodiment 2, and will not be further described;

Step 3, the UE has the report capability of processing the HS-PDSCHs of three carriers at the same time;

Step 4, as shown in FIG. 8, three HSDPA carrier resources F1, F2 and F3 are allocated to the UE, the HS-SCCH1/HS-SICH1 physical channel pair is allocated to the carrier F1 to associate with the carrier F1, the HS-SCCH2/HS-SICH2 and HS-SCCH3/HS-SICH3 physical channel pair is allocated to the carrier F2 to respectively associate with carrier F2 and carrier F3. Under this association method, in the corresponding messages of the Iub and the Uu interfaces, the carrier information of each HS-SCCH and HS-SICH physical channel itself needs to be configured, meanwhile, the carrier information associated with the physical channel pair needs to be configured. Wherein, the associated carrier information indicates the one or multiple HS-PDSCH physical channel carrier resources allocated to the UE.

Step 5, the RNC sends the HS-SCCH1/HS-SICH1 allocated to carrier F1 and the HS-SCCH2/HS-SICH2 and HS-SCCH3/HS-SCCH3 physical channel pair resources information allocated to carrier F2, including the frequency information F1 of itself, to the UE, meanwhile, sends the carrier F1 associated with the HS-SCCH1/HS-SICH1, the carrier F2 associated With the HS-SCCH2/HS-SICH2 and the carrier F3 associated with the HS-SCCH3/HS-SICH3 to the UE.

Step 6, the Node B allocates the HS-PDSCH physical channel resources on carriers F1, F2 and F3 dynamically for the user terminal to transmit the service data. The step further comprises the following steps:

Step 61, the Node B allocates the HS-PDSCH11-1n physical channel resources on carrier F1, HS-PDSCH21-2n physical channel resources on carrier F2 and HS-PDSCH31-3n physical channel resources on carrier F3 dynamically for the user terminal, and these resources are sent to UE through the HS-SCCH1, the HS-SCCH2 and the HS-SCCH3;

Step 62, the MAC-hs in the Node B distributes the service data to carriers F1, F2 and F3, the CCTrCH process, physical mapping and sending are conducted independently on each carrier;

Step 63, the UE respectively searches and monitors the HS-SCCH1, HS-SCCH2 and HS-SCCH3 physical channels associated with carriers F1, F2 and F3, if the UE identifications on the HS-SCCH1, HS-SCCH2 and HS-SCCH3 physical channels are identical with the UE identifications itself, the HS-PDSCH11-1n physical channels on carrier F1, HS-PDSCH21-2m physical channels on carrier F2 and HS-PDSCH 31-3n physical channels on carrier F3 are respectively received according to the control information relevant to the allocation of the HS-PDSCH physical channel on the HS-SCCH1, HS-SCCH2 and HS-SCCH3; and Step 64, the UE respectively receives the HS-PDSCH11-1n physical channels on carrier F1, HS-PDSCH21-2n physical channels on carrier F2 and HS-PDSCH31-3n physical channels on carrier F3, and independently conducts the processes of the physical channel mapping and the CCTrCH, and then the MAC-hs in the UE combines the service data received from carriers F1 and F2 into a complete service data and submits the service data to high layer.

Of course, the present invention may have many other embodiments, it will be understood by those of ordinary skill in the art that various changes and variations may be made thereto without departing from the spirit and scope of the present invention, and such changes and variations shall also fall within the scope of protection as defined by the following claims.

INDUSTRIAL APPLICABILITY

The method for implementing multi-carrier HSDPA technology for TD-SCDMA system provided by the present invention not only solves the problem that the down-peak-rate provided by the single-carrier HSDPA technology in the present TD-SCDMA system is lower, and especially the down-peak-rate of the single user is greatly improved, the channel characteristics of the relevant physical channel are not modified, can be complete compatible with the single-carrier HSDPA technology, and the method especially adapts for the present TD-SCDMA system of N frequency points.

What is claimed is:

1. A method for implementing multi-carrier HSDPA for a TD-SCDMA system, characterized in comprising:

Step 1, establishing a multi-carrier cell at the network side, and multiple carrier resources on the multi-carrier cell being managed and allocated as a whole at the network side;

step 2, configuring HS-PDSCH resources on at least one of the carriers of the multi-carrier cell, and configuring at least one pair of HS-SCCH and HS-SICH physical channel resources on at least one of the carriers, at the same time, creating a MAC-hs entity of a high speed media access control sub-layer to manage the channel resources on the carriers and the configuration of the MAC-hs entity itself;

step 3, the network side allocating HSDPA resources to a user terminal and sending the HSDPA resources to the user terminal; and step 4, the network side allocating the HSDPA resources on at least one of the carriers dynamically to the user terminal for service data transmission.

2. The method according to claim 1, characterized in further comprising a step that the user terminal reports to the network side the information of the number of the carriers on which it can support to perform the HS-PDSCH processes simultaneously, the information is multi-carrier HSDPA capability information.

3. The method according to claim 1, characterized in further comprising a step of releasing the HSDPA resources allocated to the user terminal.

4. The method according to claim 1, characterized in that each HS-SCCH and a certain HS-SICH on the same carrier are configured as a pair in step 2.

5. The method according to claim 1, characterized in that allocating HSDPA resources by the network side to a user terminal in step 3 further comprises:

step 31, a RNC at the network side determines to allocate multi-carrier HSDPA resources for the user terminal and sends a request message to the Node B;

step 32, a MAC-hs entity in the Node B at the network side allocates at least one of the carriers on which HS-PDSCH physical channels resources will be allocated for service data transmission to the user terminal according to the information of the supported number of carriers reported by the user terminal and the service characteristics carried by the HS-DSCH; and step 33, the MAC-hs entity in the Node B at the network side allocates at least one pair of the HS-SCCH and HS-SICH physical channel resources to associate with the HS-PDSCH resources on each carrier for carrying the control information of allocating the HS-PDSCH on the carrier and receiving feedback information.

6. The method according to claim 1 or 5, characterized in further comprising:

step 34, a radio network controller at the network side allocates associated dedicated channel resources on a carrier to the user terminal.

7. The method according to claim 1, characterized in that sending the HSDPA resources to the user terminal in step 3 further comprises:

step 35, the network side sends the HSDPA resources allocated to the user terminal to the user terminal through the methods specified in a radio resource control (RRC) protocol for a Uu interface; and step 36, the user terminal creates and configures a MAC-hs entity to configure the physical channel resources of the HSDPA resources and configures the associated dedicated channel resources.

8. The method according to claim 5, characterized in that at least one pair of the HS-SCCH and HS-SICH physical channel resources allocated to associate with the HS-PDSCH resources on each carrier in step 33 are on the same carrier as that of the HS-PDSCH resources.

9. The method according to claim 5, characterized in that at least one pair of the HS-SCCH and HS-SICH physical channel resources allocated to associate with the HS-PDSCH resources on each carrier in step 33 are on same or different carriers as that of the HS-PDSCH resources, but all pairs of HS-SCCH and HS-SICH physical channel resources of one user terminal are on the one carrier.

10. The method according to claim 5, characterized in that at least one pair of the HS-SCCH and HS-SICH physical channel resources allocated to associate with the HS-PDSCH resources on each carrier in step 33 are on same or different carriers as that of the HS-PDSCH resources, and all pairs of HS-SCCH and HS-SICH physical channel resources of one user terminal are on multiple carriers.

11. The method according to claim 1, characterized in that step 4 further comprises:

step 41, the network side allocates the HS-PDSCH resources on at least one of the carriers dynamically for the user terminal;

step 42, the network side distributes the service data to at least one of the allocated carriers and sends it to the user terminal;

step 43, the user terminal searches and monitors the HS-SCCH physical channels associated with HS-PDSCH resources on each carrier; and step 44, the user terminal receives the HS-PDSCH physical channels and combines the service data on at least one of the carriers into a complete service data stream.

12. The method according to claim 11, characterized in that when the service data is distributed and sent in step 42, a hybrid automatic retransmission request (HARQ) function entity in the MAC-hs entity distinguishes multiple carriers and meanwhile processes multiple HAPQ protocol processes on each carrier independently, the HARQ processes on each said carrier are distinguished by the carrier property, each said process is identified by both the carrier property and a process number, and the HARQ processes with the same carrier property and the same process number in the Node B at the network side corresponds to that in the user terminal one by one.

13. The method according to claim 12, characterized in that during the distribution and sending the service data, the Node B at the network side sends the HARQ process number for each carrier to the user terminal via the HS-SCCH channel allocated to the user terminal to associate with the carrier; at the user terminal side, the user terminal sends feedback information, including confirmation information for confirming whether transmission is correct and channel radio quality indication information, to Node B through the HS-SICH channel which pairs to the HS-SCCH.

14. The method according to claim 1, characterized in that the step of establishing a multi-carrier cell by the network side in step 1 is realized through that a radio network controller (RNC) initiates a cell setup process and a common transport channel setup process which are specified in a Node B application protocol to the Node B through an Iub interface.

15. The method according to claim 1, characterized in that the step of configuring HS-PDSCH resources on at least one of the carriers in step 2 is realized through that a RNC initiates a physical shared channel reconfiguration process which is specified in a NBAP protocol to the Node B through the Iub interface;

wherein, a carrier frequency information element is added into a "PHYSICAL SHARED CHANNEL RECONFIGURATION REQUEST" message corresponding to the physical shared channel reconfiguration process to indicate which carriers the HS-PDSCH physical channel resources should be configured.

16. The method according to claim 1, characterized in that the step of allocating HSDPA resources to the user terminal is realized through that the RNC initiates a radio link setup process and a synchronous radio setup reconfiguration preparation process or an asynchronous radio link reconfiguration process which are specified in the NBAP protocol to Node B through the tub interface;

wherein, a multi-carrier HSDPA capability information element of the user terminal is added into the messages of "RADIO LINK SETUP REQUEST", "RADIO LINK RECONFIGURATION PREPARE" and "RADIO LINK RECONFIGURATION REQUEST" which correspond to the radio link setup process, the synchronous radio setup reconfiguration process and the asynchronous radio link reconfiguration process; and carrier property information is added into the messages of "RADIO LINK SETUP RESPONSE", "RADIO LINK RECONFIGURATION READY" and "RADIO LINK RECONFIGURATION RESPONSE" for indicating the carriers on which the HS-PDSCH physical channel resources and the associated HS-SCCH and HS-SICH physical channel pair resources are allocated to the user terminal, and the carriers to which the HARQ configuration information belongs.

17. The method according to claim 1, characterized in that the step of sending the allocated HSDPA resources to the user terminal in step 3 is realized through that the RNC initiates a RRC connection setup process, a radio bearer setup process, a radio bearer reconfiguration process, a radio bearer release process, a transport channel reconfiguration process, a physical channel reconfiguration process and a cell update process which are specified in the RRC protocol to the user terminal through the Uu interface;
wherein, carrier property information element is added into the messages of "RRC CONNECTION SETUP", "RADIO BEARER SETUP", "RADIO BEARER RECONFIGURATION", "RADIO BEARER RELEASE", "TRANSPORT CHANNEL RECONFIGURATION", "PHYSICAL CHANNEL RECONFIGURATION" and "CELL UPDATE CONFIRM" which correspond to the RRC connection setup process, the radio bearer setup process, the radio bearer reconfiguration process, the radio bearer release process, the transport channel reconfiguration process, the physical channel reconfiguration process and the cell update process, for indicating the HSDPA resource of each carrier allocated to the user terminal.

18. The method according to claim 16 or 17, characterized in that an information element of the number of carriers is further added into the messages for indicating the number of carriers that the user terminal can use at the same time.

* * * * *